United States Patent [19]

Kitahara et al.

[11] 4,424,306

[45] Jan. 3, 1984

[54] METHOD FOR MODIFYING CIS-1,4-POLYISOPRENE RUBBER

[75] Inventors: Shizuō Kitahara, Kawaguchi; Toshihiro Fujii; Nagatoshi Sugi, both of Yokohama, all of Japan

[73] Assignee: Nippon Zeon Co., Ltd., Tokyo, Japan

[21] Appl. No.: 389,114

[22] Filed: Jun. 16, 1982

[30] Foreign Application Priority Data

Jun. 23, 1981 [JP] Japan .................................. 56-97051

[51] Int. Cl.³ .............................................. C08L 75/00
[52] U.S. Cl. .................................... 525/131; 525/130; 525/128
[58] Field of Search ....................... 525/131, 130, 128

[56] References Cited

U.S. PATENT DOCUMENTS 3,894,996  7/1975  Srail .................................. 525/131
4,235,979 11/1980  Hergenrother et al. ............ 525/131

*Primary Examiner*—Melvyn I. Marquis
*Assistant Examiner*—Ana L. Carrillo
*Attorney, Agent, or Firm*—Sherman & Shalloway

[57] ABSTRACT

A method for modifying cis-1,4-polyisoprene rubber, which comprises reacting a diisocyanate with a primary diamine in the presence of the cis-1,4-polyisoprene rubber.

18 Claims, No Drawings

METHOD FOR MODIFYING CIS-1,4-POLYISOPRENE RUBBER

This invention relates to a method for modifying cis-1,4-polyisoprene rubber. More specifically, this invention relates to a method for producing cis-1,4-polyisoprene rubber capable of giving a vulcanizate having excellent strength, by reacting a diisocyanate with a primary diamine in the presence of cis-1,4-polyisoprene rubber.

cis-1,4-Polyisoprene rubber is a synthetic rubber having a chemical structure similar to natural rubber, and is used as a substitute for natural rubber in many fields. It has been desired however to improve the cis-1,4-polyisoprene rubber because in comparison with natural rubber, it has some defects in regard to its properties both in the unvulcanized and vulcanized states. One defect is that with the same compounding recipe, cis-1,4-polyisoprene rubber has a lower tensile stress than natural rubber, and increasing of its tensile stress by, for example, increasing the amount of the vulcanization system will result in a marked reduction in strength. This defect is especially remarkable in a so-called pure rubber compound not containing a reinforcing agent (e.g., carbon) and a filler, but is also noted in a compound containing the reinforcing agent and filler.

It is an object of this invention to provide cis-1,4-polyisoprene rubber capable of giving a vulcanizate having a high tensile stress and excellent strength.

This object is achieved in accordance with this invention by reacting a diisocyanate with a primary diamine in the presence of cis-1,4-polyisoprene rubber.

The cis-1,4-polyisoprene rubber (to be sometimes abbreviated simply as polyisoprene) is polyisoprene rubber containing at least 90% of cis-1,4 linkages which is obtained by a known polymerization method using a Ziegler-type catalyst, an organic alkali metal, etc. To provide a good balance with various properties of vulcanizates, this rubber desirably has a Mooney viscosity ($ML_{1+4}$, 100° C.) of at least 30.

Known aliphatic, aromatic or aliphatic-aromatic diisocyanates used in the production of polyurethans can be used in the present invention. Examples include ethylene diisocyanate, hexamethylene diisocyanate, propylene-1,2-diisocyanate, 1,4-diisocyanatocyclohexane, m- and p-phenylene diisocyanates, toluene diisocyanate, p,p'-diphenyl diisocyanate, 1,5-napthalene diisocyanate, p,p'-diphenylmethane diisocyanate, and phenylethane diisocyanate. These diisocyanates may be used singly or as a mixture.

Suitable primary diamines (to be sometimes referred to simply as diamines) used in this invention are aliphatic, alicyclic or aromatic primary diamines known, for example, as raw materials for polyamides or as curing agents for epoxy resins. Examples include $\alpha,\omega$-polymethylene diamines (e.g., ethylene diamine and hexamethylenediamine), polyether diamines [$H_2N(CH_2)_nO(CH_2CH_2O)_m(CH_2)_nNH_2$], menthanediamine, 1,3-diaminocyclohexane, m- or p-phenylenediamine, 4,4'-diaminodiphenylmethane, 4,4'-diaminodiphenyl ether, 4,4'-diaminodiphenylsulfone, diethylenetriamine, bis-hexamethylenetriamine, and pentaethylenehexamine. They are used either singly or as a mixture.

The ratio of the diisocyanate to the diamine is not particularly limited, but ratios of about 1:1, for example from 1:0.7 to 1:1.3, are preferred because they produce especially good improving effects. The amounts of the diisocyanate and the diamine are neither restricted. The preferred combined amount of the two compounds is from 0.3 to 20 parts by weight, especially from 1 to 15 parts by weight, per 100 parts by weight of the polyisoprene rubber. Amounts of less than 0.3 part by weight are scarcely effective, and amounts exceeding 20 parts by weight tend to result in the loss of the inherent properties of the polyisoprene rubber.

One preferred method of reacting the diisocyanate with the diamine is a solid-phase method which comprises separately or simultaneously adding the diisocyanate and the diamine to the polyisoprene rubber, kneading them by using a mixer such as a roll, a Banbury mixer, a continuous mixer, an extruder or a transfer mixer, and if required, heating the mixture to a temperature sufficient to dissolve the diamine in the rubber, thereby reacting them. Another preferred method is a liquid-phase method which comprises adding the diisocyanate and the diamine separately or simultaneously to a solution of polyisoprene rubber, such as a polyisoprene rubber solution as obtained by polymerization, or a solution of solid polyisoprene rubber in an organic solvent, and reacting them with stirring, if required while heating the mixture. The above two methods may be used together in order to cause the reaction to proceed completely.

The reaction product of the diisocyanate and the diamine forms domains having a size of several hundred Å in the polyisoprene rubber, and this is considered to produce the effect of this invention. Even if the diisocyanate and the diamine are reacted fully in advance and the resulting high-molecular-weight solid product is admixed with the polyisoprene rubber, the object of this invention cannot be achieved because the size of the dispersed units is large. However, if the degree of reaction is low in the product obtained by reacting the diisocyanate and the diamine in advance, it may be further reacted in the presence of the polyisoprene rubber. This further reaction results in the formation of domains of the above-mentioned size by the reaction product, and the object of this invention can be achieved.

In the method of this invention, the condensation reaction can be promoted by adding a small amount of a tertiary amine, etc. in the reaction of the diisocyanate with the diamine.

The improving effect by the method of this invention is greater when the polyisoprene rubber used has in its molecule a substituent having reactivity with the isocyanate group and/or the amino group, such as an epoxy, aldehyde, carboxyl, N-methylol, amido, amino or isocyanate group, or halogen. The various substituents exemplified above can be introduced in advance into the polyisoprene rubber molecules by a known addition-reaction, etc.

If aliphatic compounds having at least 4 carbon atoms account for at least 20% by weight of the entire diisocyanate and diamine used, an additional merit is brought about in that the tear strength of a polyisoprene rubber vulcanizate containing carbon is improved. This presumably has to do with the general fact that a polyurea formed by the reaction of an aliphatic diisocyanate with an aliphatic diamine has a relatively flexible molecular structure.

Since the polyisoprene rubber modified by the method of this invention gives vulcanizates having markedly improved tensile stress and tensile strength, it can be used in the production of tires, belts and other various rubber products.

The following examples illustrate the present invention more specifically. All parts in these examples are by weight.

EXAMPLE 1

In each run, the diisocyanate and the diamine shown in Table 2 were reacted in the presence of cis-1,4-polyisoprene rubber (Nipol IR2200, a product of Nippon Zeon Co., Ltd.; cis-1,4 linkages more than 97%, $ML_{1+4}$, 100° C.=83), polyisoprene rubber containing an epoxy group, or polyisoprene rubber containing an aldehyde group while they were kneaded in a Brabender plastograph (manufactured by Brabender OHG of west Germany) to give a sample rubber (Run Nos. 4 to 7). In performing the reaction, 0.3 part, per 100 parts of rubber, of triethylamine was added as a condensation promoter. The rotating speed of the rotor of the plastograph was adjusted to 50 rpm, and the kneading was carried out at a temperature of 140° C. for a period of 2 minutes.

The epoxy-containing polyisoprene rubber of Run No. 6 was obtained by dissolving 250 g of the above-mentioned cis-1,4-polyisoprene rubber in 4 liters of benzene, adding 22 g of acetic acid and 51 g of 30% aqueous hydrogen peroxide with stirring, and reacting the mixture at room temperature for 3 hours, pouring the reaction product into about 10 liters of methyl alcohol to coagulate it, and drying it under reduced pressure. By a titration method, this product was found to contain about 0.4 epoxy group per 100 isoprene units.

The aldehyde group-containing polyisoprene rubber of Run No. 7 was obtained by kneading 60 g of cis-1,4-polyisoprene rubber and 13 g of a 40% aqueous solution of glyoxal in a Brabender plastograph. During the kneading, the rotating speed of the rotor of the plastograph was adjusted to 50 rpm, and the kneading was carried out at a temperature of 140° C. for 2 minutes.

Separately, the diisocyanate and diamine shown in Table 2 were reacted in a 5% benzene solution of the aforesaid cis-1,4-polyisoprene rubber at room temperature for 3 hours with stirring by using 0.3 part, per 100 parts of rubber, of triethylamine as a condensation reaction promoter. The reaction mixture was subjected to steam stripping, and dried under reduced pressure to give a sample rubber (Run No. 8).

Each of the sample rubbers was kneaded on a small-sized roll in accordance with each of the compounding recipes shown in Table 1 to form a rubber compound. The rubber compound was press-cured at 145° C. for each of the vulcanization times shown in Table 2 to form a vulcanized sheet having a thickness of about 2 mm. A dumbbell-shaped No. 3 test sample in accordance with JIS-K6301 was punched out from the vulcanized sheet, and subjected to a tensile test at room temperature and a pulling speed of 500 m/min.

For comparison, the same test as above was conducted on the aforesaid cis-1,4-polyisoprene rubbers to which the method of this invention was not applied, and natural rubber (Run Nos. 1 to 3).

The results are shown in Table 2.

TABLE 1

| Pure rubber compounding recipe | | |
|---|---|---|
| | Compounding recipe I | Compounding recipe II |
| Sample rubber | 100 (parts) (*3) | 100 (parts) (*3) |
| Active zinc oxide | 3.3 | 4.0 |
| Stearic acid | 1.7 | 2.0 |
| Sulfur | 3.3 | 4.0 |
| Nocceler F (*1) | 1.7 | 2.0 |
| Nocrac 200 (*2) | 1.0 | 1.0 |

(*1): A vulcanization accelerator made by Ohuchi Shinko Kagaku Kogyo Co., Ltd. (a mixture of benzothiazolyl disulfide, diphenylguanidine and hexamethylenetetramine).
(*2): An antioxidant made by Ohuchi Shinko Kagaku Kogyo Co., Ltd. (2,6-di-tert. butyl-4-methylphenol).
(*3): The total amount of the rubber containing the reaction product of the diisocyanate and the diamine was 100 parts.

TABLE 2

| Run No. | Sample rubber | Compounding recipe | Vulcanization time (min.) | 300% tensile stress (kg/cm$^2$) | Tensile strength (kg/cm$^2$) | Elongation at break (%) |
|---|---|---|---|---|---|---|
| Comparison | | | | | | |
| 1 | Polyisoprene rubber | | I | 15 | 24 | 180 | 600 |
| 2 | Polyisoprene rubber | | II | 14 | 30 | 64 | 330 |
| 3 | Natural rubber (RSS No. 3) | | I | 10 | 33 | 235 | 610 |
| Invention | | | | | | |
| 4 | Polyisoprene rubber (100 parts) Hexamethylene diisocyanate (2.5 parts) p-Phenylene diamine (2.5 parts) | Reacted during kneading | I | 10 | 38 | 195 | 550 |
| 5 | Polyisoprene rubber (100 parts) Naphthalene diisocyanate (2.0 parts) p-Phenylenediamine (2.5 parts) | Reacted during kneading | I | 10 | 39 | 181 | 510 |
| 6 | Epoxy-containing polyisoprene rubber (100 parts) Naphthalene diisocyanate (2.0 parts) Propanediamine (1.0 part) | Reacted during kneading | I | 10 | 40 | 236 | 590 |
| 7 | Aldehyde group-containing polyisoprene rubber (100 parts) Naphthalene diisocyanate (5.0 parts) Propanediamine (2.5 parts) | Reacted during kneading | I | 15 | 35 | 227 | 620 |
| 8 | Polyisoprene rubber (100 parts) Hexamethylene diisocyanate (3.0 parts) p-Phenylenediamine (3.0 parts) | Reacted in solution | I | 10 | 31 | 207 | 590 |

It is seen from Table 2 that with the same compounding recipe, the polyisoprene rubber has a lower 300% tensile stress than natural rubber (by a comparison of Run No. 1 with Run No. 3), and when its tensile stress is increased by increasing the amount of the vulcanization system (Run No. 2), its tensile strength is markedly reduced. According to this invention (Runs Nos. 4 to 8), the 300% tensile stress of the polyisoprene rubber can be increased without a significant reduction in tensile strength, and a rubber having similar properties to natural rubber can be obtained. In particular, when polyisoprene containing a functional group is used (Runs Nos. 6 and 7), excellent tensile strength can be obtained.

EXAMPLE 2

In each run, the diisocyanate and the diamine shown in Table 4 were reacted in the presence of the same polyisoprene rubber as in Example 1, the same epoxy group-containing polyisoprene rubber as in Example 1, or a carboxy-containing polyisoprene rubber using 0.3 part, per 100 parts of rubber, of triethylamine as a condensation promoter while they were kneaded in a Brabender plastograph under the same kneading conditions as in Example 1 to form a sample rubber (Runs Nos. 12 to 16).

The carboxy-containing polyisoprene rubber of Run No. 15 was obtained by reacting 60 g of the same cis-1,4-polyisoprene rubber as in Example 1 with 0.8 g of thioglycollic acid while kneading them in a Brabender plastograph. The rotating speed of the rotor of the plastograph during kneading was adjusted to 50 rpm, and the kneading was carried out at 140° C. for 2 minutes.

Each of the sample rubbers was kneaded with the compounding agents in each of the compounding recipes shown in Table 3 excepting sulfur and the vulcanization accelerator in a small-sized Banbury type mixer (Laboplastomill manufactured by Toyo Seiki Co., Ltd.). Then, sulfur and the vulcanization accelerator were added to the resulting mixture on a small-sized roll, and they were kneaded to prepare a rubber compound. The rubber compound was press-cured at 145° C. for each of the vulcanization times shown in Table 4 to give a vulcanized sheet having a thickness of 2 mm.

A dumbbell-shaped No. 3 test specimen in accordance with JIS-K6301 was punched out from the vulcanized sheet, and subjected to a tensile test at room temperature and a pulling speed of 500 mm/min.

A rectangular test specimen, 15 mm wide and 100 mm long, was stamped out from the vulcanized sheet, and a cut having a length of 6 mm was formed by a safety razor centrally in one longitudinal side edge of the specimen at right angles to the side edge. The specimen was subjected to a tear test at a pulling speed of 500 mm/min. The tear strength value was an average value of 12 specimens (6 with the grains running the long way of the specimen and 6 with the grains running across the specimen).

For comparison, the same test was conducted on the aforesaid cis-1,4-polyisoprene rubbers to which the method of this invention was not applied, and natural rubber (Runs Nos. 9 to 11).

The results are shown in Table 4.

TABLE 3

| Carbon black compounding recipe | | |
|---|---|---|
| | Compounding recipe III | Compounding recipe IV |
| Sample rubber | 100 parts (*3) | 100 parts (*3) |
| HAF carbon | 50 | 50 |
| Aroma oil | 5 | 5 |
| Zinc oxide | 5 | 5 |
| Stearic acid | 2 | 2 |
| Sulfur | 2.5 | 3.5 |
| Nocceler MSA-F (*1) | 0.8 | 1.1 |
| Nocrac 810NA (*2) | 1.0 | 1.0 |

(*1): A vulcanization accelerator manufactured by Ohuchi Shinko Kagaku Kogyo Co., Ltd. (N—oxidiethylene-2-benzothiazyl sulfenamide).
(*2): An antioxidant manufactured by Ohuchi Shinko Kagako Kogyo Co., Ltd. (N—isopropyl-N'—phenyl-p-phenylenediamine).
(*3): The total amount of the rubber containing the reaction product of the diisocyanate and the diamine was 100 parts.

TABLE 4

| Run No. | Sample rubber | | Compounding recipe | Vulcanization time (min.) | 300% tensile stress (kg/cm²) | Tensile strength (kg/cm²) | Elongation at break (%) | Tear strength (kg/cm) |
|---|---|---|---|---|---|---|---|---|
| Comparison | | | | | | | | |
| 9 | Polyisoprene rubber | | III | 22 | 125 | 284 | 570 | 37 |
| 10 | Polyisoprene rubber | | IV | 21 | 149 | 253 | 470 | 30 |
| 11 | Natural rubber (RSS No. 3) | | III | 22 | 147 | 292 | 530 | 55 |
| Invention | | | | | | | | |
| 12 | Polyisoprene rubber (100 parts) Hexamethylene diisocyanate (2.5 parts) p-Phenylenediamine (2.5 parts) | Reacted during kneading | III | 19 | 162 | 291 | 510 | 46 |
| 13 | Epoxy-containing polyisoprene rubber (100 parts) Naphthalene diisocyanate (3.5 parts) Hexamethylenediamine (1.9 parts) | Reacted during kneading | III | 20 | 150 | 282 | 530 | 52 |
| 14 | Epoxy-containing polyisoprene rubber (100 parts) Hexamethylene diisocyanate (2.5 parts) p-Phenylenediamine (2.5 parts) | Reacted during kneading | III | 20 | 149 | 280 | 520 | 50 |
| 15 | Carboxy-containing polyisoprene rubber (100 parts) Hexamethylene diisocyanate (2.5 parts) p-Phenylenediamine (2.5 parts) | Reacted during kneading | III | 18 | 158 | 275 | 500 | 49 |

TABLE 4-continued

| Run No. | Sample rubber | Compounding recipe | Vulcanization time (min.) | 300% tensile stress (kg/cm$^2$) | Tensile strength (kg/cm$^2$) | Elongation at break (%) | Tear strength (kg/cm) |
|---|---|---|---|---|---|---|---|
| 16 | Epoxy-containing polyisoprene rubber (100 parts) Naphthalene diisocyanate (3.5 parts) p-Phenylenediamine (1.8 parts) | Reacted during kneading | III | 20 | 148 | 278 | 520 | 37 |

From the results shown in Table 4, it has seen that with the same compounding recipe, the polyisoprene rubber has a lower 300% tensile stress than natural rubber (by a comparison of Run No. 9 with Run No. 11), and when its tensile stress is increased by increasing the amount of the vulcanization system (Run No. 10), its tensile strength and tear strength are reduced.

According to this invention (Runs Nos. 12 to 16), 300% tensile stress can be increased without a significant reduction in tensile strength and tear strength. In particular, when an aliphatic compound is used as the diisocyanate or the diamine (Runs Nos. 12 to 15), tensile strength becomes relatively high.

What we claim is:

1. A method for modifying cis-1,4-polyisoprene rubber obtained by using a Ziegler-type catalyst, which comprises reacting a diisocyanate with a primary diamine in the presence of the cis-1,4-polyisoprene rubber.

2. The method of claim 1 wherein the mole ratio of the diisocyanate to the primary amine is from 1:0.7 to 1:1.3.

3. The method of claim 1 wherein the total amount of the diisocyanate and the primary diamine is from 0.3 to 20 parts by weight per 100 parts by weight of the cis-1,4-polyisoprene rubber.

4. The method of claim 1 wherein the reaction is carried out in the further presence of a tertiary amine as a condensation promoter.

5. The method of claim 1 wherein the reaction is carried out in the solid phase.

6. The method of claim 1 wherein the reaction is carried out in the liquid phase.

7. The method of claim 2 wherein the total amount of the diisocyanate in the primary diamine is from 0.3 to 20 parts by weight per 100 parts by weight of the cis-1,4-polyisoprene rubber.

8. The method of claim 7 wherein the reaction is carried out in the further presence of a tertiary amine as a condensation promoter.

9. The method of claim 1 wherein said diisocyanate is at least one compound selected from the group consisting of ethylene diisocyanate, hexamethylene diisocyanate, propylene-1,2-diisocyanate, 1,4-diisocyanatocyclohexane, m-phenylene diisocyanate, p-phenylene diisocyanate, toluene diisocyanate, p,p'-diphenyl diisocyanate, 1,5-naphthalene diisocyanate, p,p'-diphenylmethane diisocyanate, and phenylethane diisocyanate; and wherein said primary diamine is at least one compound selected from the group consisting of α,ω-polymethylene diamines, polyether diamines, methanediamine, 1,3-diaminocyclohexane, m- or p-phenylenediamine, 4,4'-diaminodiphenylmethane, 4,4'-diaminodiphenyl ether, 4,4'-diaminodiphenylsulfone, diethylenetriamine, bishexamethylenetriamine, and pentaethylenehexamine.

10. The method of claim 7 wherein the diisocyanate is hexamethylene diisocyanate and the primary diamine is p-phenylenediamine.

11. The method of claim 10 wherein the polyisoprene rubber is characterized by having more than 97% of cis-1,4 linkages and by an ML$_{1+4}$, 100° C.=83.

12. The method of claim 10 wherein the polyisoprene rubber is an epoxy-containing polyisoprene rubber obtained by reacting a mixture of the cis-1,4-polyisoprene rubber with acetic acid and hydrogen peroxide.

13. The method of claim 10 wherein the polyisoprene rubber is a carboxy-containing polyisoprene rubber obtained by reacting the cis-1,4-polyisoprene rubber with thioglycollic acid.

14. The method of claim 7 wherein the diisocyanate is naphthalene diisocyanate, and the primary diamine is p-phenylenediamine.

15. The method of claim 14 wherein the cis-1,4-polyisoprene rubber contains at least 97% of cis-1,4 linkages and has an ML$_{1+4}$, 100° C.=83.

16. The method of claim 14 wherein the cis-1,4-polyisoprene rubber obtained by reacting a mixture of the cis-1,4-polyisoprene rubber with acetic acid and hydrogen peroxide.

17. The method of claim 7 wherein the diisocyanate is naphthalene diisocyanate and the primary diamine is propane diamine and the cis-1,4-polyisoprene rubber is an epoxy-containing polyisoprene rubber obtained by reacting a mixture of the cis-1,4-polyisoprene rubber with acetic acid and hydrogen peroxide or an aldehyde group-containing polyisoprene rubber which is obtained by kneading the cis-1,4-polyisoprene rubber with an aqueous solution of glyoxal.

18. The method of claim 7 wherein the diisocyanate is naphthalene diisocyanate, the primary diamine hexamethylenediamine and the cis-1,4-polyisoprene rubber is an epoxy-containing polyisoprene rubber obtained by reacting a mixture of the cis-1,4-polyisoprene rubber with acetic acid and hydrogen peroxide.

* * * * *